US011087382B2

(12) United States Patent
Greenberger et al.

(10) Patent No.: US 11,087,382 B2
(45) Date of Patent: Aug. 10, 2021

(54) ADAPTING DIGITAL ORDER TO VENUE SERVICE QUEUE

(71) Applicant: INTERNATIONAL BUSINESS MACHINES CORPORATION, Armonk, NY (US)

(72) Inventors: Jeremy A. Greenberger, Raleigh, NC (US); Jeffrey A. Kusnitz, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 315 days.

(21) Appl. No.: 15/819,875

(22) Filed: Nov. 21, 2017

(65) Prior Publication Data
US 2019/0156399 A1    May 23, 2019

(51) Int. Cl.
| | | |
|---|---|---|
| G06Q 10/00 | (2012.01) | |
| G06Q 30/00 | (2012.01) | |
| H04W 4/00 | (2018.01) | |
| H04W 88/00 | (2009.01) | |
| G06Q 30/06 | (2012.01) | |
| G06Q 10/06 | (2012.01) | |
| H04W 4/02 | (2018.01) | |
| H04W 88/02 | (2009.01) | |

(52) U.S. Cl.
CPC ... *G06Q 30/0635* (2013.01); *G06Q 10/06316* (2013.01); *H04W 4/02* (2013.01); *H04W 88/02* (2013.01)

(58) Field of Classification Search
CPC ........ G06Q 10/00–50/10; H04W 4/02; H04W 88/02
USPC ............................................. 705/7.26
See application file for complete search history.

(56) References Cited

U.S. PATENT DOCUMENTS

| | | | |
|---|---|---|---|
| 9,015,069 B2 | 4/2015 | Brantley et al. | |
| 9,064,359 B2 | 6/2015 | Lert, Jr. et al. | |
| 2006/0178943 A1* | 8/2006 | Rollinson | G06Q 30/0601 |
| | | | 705/26.1 |
| 2009/0076875 A1* | 3/2009 | Lert, Jr. | G06Q 30/016 |
| | | | 705/14.3 |
| 2012/0290390 A1* | 11/2012 | Harman | G06Q 10/107 |
| | | | 705/14.53 |
| 2013/0024299 A1 | 1/2013 | Wong et al. | |

(Continued)

OTHER PUBLICATIONS

Anonymous, "Smart Queue System"; http://ip.com/IPCOM/000246383D; Jun. 2, 2016, 13 pgs.

(Continued)

*Primary Examiner* — Alan S Miller
*Assistant Examiner* — Mustafa Iqbal
(74) *Attorney, Agent, or Firm* — Stephanie Carusillo; Hye Jin Lucy Song; Heslin Rothenberg Farley & Mesiti PC (57) ABSTRACT

Methods, computer program products, and systems are presented. The methods include, for instance: obtaining a digital order via a mobile device from a user and determining the digital order is placed within a venue boundary for an immediate pickup. Certain exceptions are checked, and the digital order is merged with a physical queue of patrons waiting to be serviced at a device virtual position, provided the digital order is no exception based on digital order rules. The order is scheduled for later service according to the device virtual position and the user is informed as such.

20 Claims, 4 Drawing Sheets

(56) References Cited

U.S. PATENT DOCUMENTS

| | | | |
|---|---|---|---|
| 2013/0090957 A1* | 4/2013 | Popkey | G06Q 10/063 |
| | | | 705/5 |
| 2014/0046718 A1* | 2/2014 | Schiller | G07C 11/00 |
| | | | 705/7.21 |
| 2014/0279269 A1* | 9/2014 | Brantley | G06Q 30/0635 |
| | | | 705/26.81 |
| 2015/0286967 A1 | 10/2015 | Lert et al. | |
| 2015/0379434 A1* | 12/2015 | Argue | G06Q 10/02 |
| | | | 705/5 |
| 2016/0063435 A1* | 3/2016 | Shah | G06Q 20/42 |
| | | | 705/44 |

OTHER PUBLICATIONS

Anonymous, "System to Commodify Position in a Queue"; http://ip.com/IPCOM/000240086D; Dec. 29, 2014, 4 pgs.

Protin, C., "How to Skip the Long Lines at Chipotle", (Video) [retrieved on Aug. 7, 2017]. Retrieved from the Internet: < URL: http://www.techinsider.io/chipotle-pick-up-app-2015-9>, Business Insider, Sep. 23, 2015, 2 pgs.

Mell, Peter, et al., "The NIST Definition of Cloud Computing", NIST Special Publication 800-145, Sep. 2011, Gaithersburg, MD, 7 pgs.

* cited by examiner

ADAPTING DIGITAL ORDER TO VENUE SERVICE QUEUE

TECHNICAL FIELD

The present disclosure relates to digital business technology, and more particularly to methods, computer program products, and systems for integrating service queues of various origins in digital marketing.

BACKGROUND

In existing digital order systems, digital orders remotely placed in advance receive prioritized services, as venues promote usage of their proprietary mobile app for placing digital orders to the venues. Although such promotional offerings may draw more attention and increase market share by promoting mobile apps and digital orders, the existing digital order systems may incur other kind of challenges that may beat the promotional purposes.

SUMMARY

The shortcomings of the prior art are overcome, and additional advantages are provided, through the provision, in one aspect, of a method. The method for optimally arranging an order of service for a digital order at a venue includes, for instance: obtaining, by one or more processor, the digital order from a mobile device of a user; ascertaining that the digital order requests an immediate service prior to servicing all patrons in the venue forming a physical queue, based on a requested pickup time associated with the digital order; determining that the digital order is local based on a location of the mobile device originating the digital order and a preconfigured venue boundary; searching one or more digital order rules that is applicable for the digital order, wherein the digital order is local and requesting the immediate service; integrating the digital order with the physical queue of patrons in the venue waiting to be serviced, by use of a device virtual position corresponding to the digital order in the physical queue, responsive to discovering no digital order rule applicable for the digital order from the searching; and facilitating the digital order to be serviced by notifying a venue employee of a service entry for the digital order, and by sending an order confirmation to the user with an estimated wait time.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
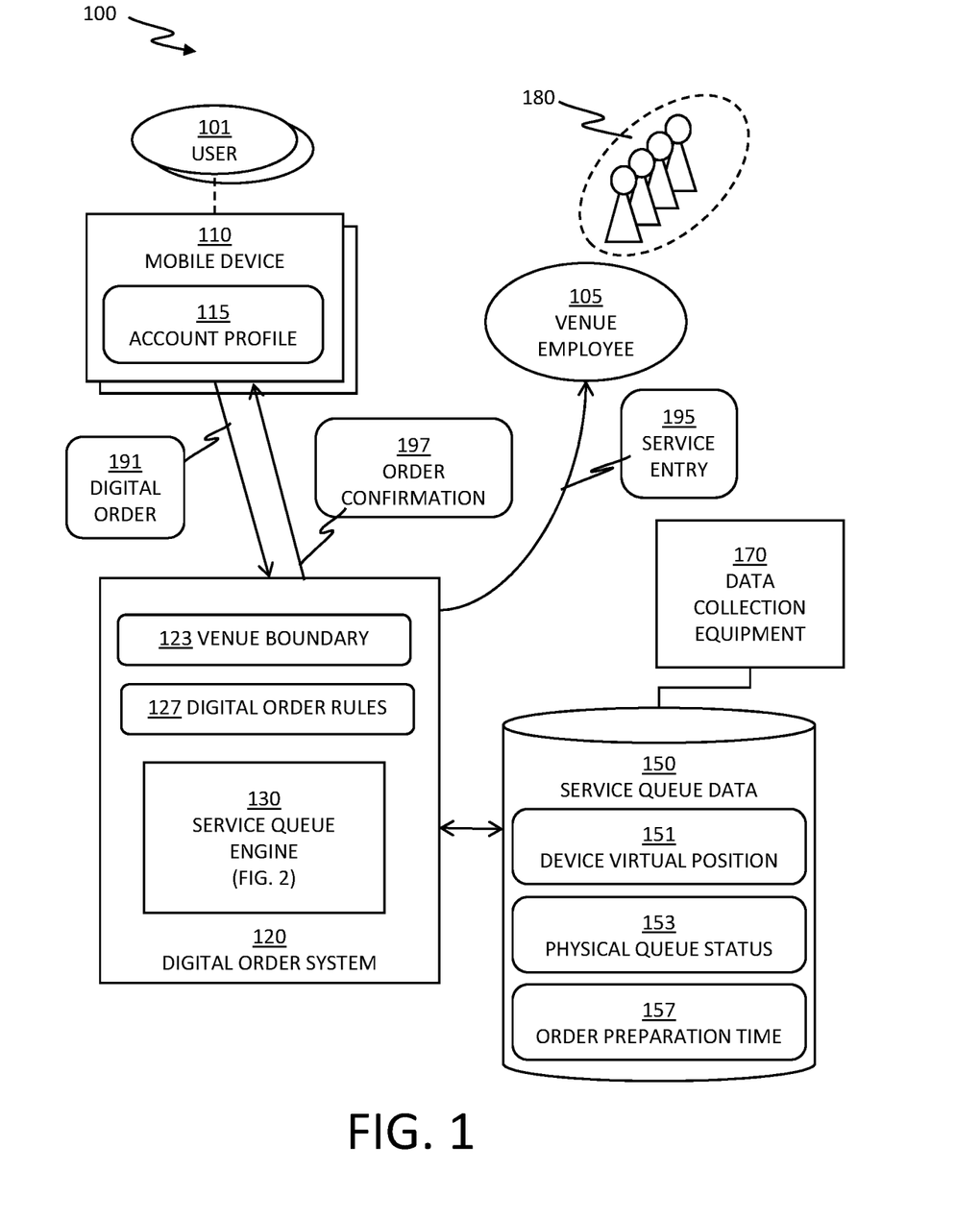
FIG. 1 depicts a system for optimally arranging an order of service for a digital order at a venue, in accordance with one or more embodiments set forth herein.

FIG. 1 depicts a system 100 for optimally arranging an order of service for a digital order at a venue, in accordance with one or more embodiments set forth herein.

The system 100 in the venue includes a digital order system 120, which receives a digital order 191 from a user 101 via a mobile device 110. The user 101 is registered with the digital order system 120 in order to place digital orders to be serviced at venues utilizing the digital order system 120, as in brand mobile apps. The mobile device 110 stores an account profile 115 of the user 101 with the digital order system 120.

Upon receiving the digital order 191 from the mobile device 110, the digital order system 120 generates a service entry 195 corresponding to the digital order 191 and sends the service entry 195 to a venue employee 105 to service the digital order 191. The digital order system 120 also sends an order confirmation 197 to the user 101, informing the user 101 that the digital order 191 will be serviced from the venue at a certain time. The digital order system 120 may be a component of a digital marketing system for venues such as IBM Marketing Cloud/IBM Presence Insights.

The venue employee 105 services a physical queue 180, including two or more patrons waiting in line at the venue as well as the digital order 191. Some venues service digital orders with priorities over physical queues at the venues, in order to promote digital orders placed in advance from remote locations. However, if the digital orders are locally placed in or around the venue, patrons in the physical queue 180 are to wait longer than the time required for servicing the physical queue 180, because the locally placed digital orders would be processed with priorities as if the digital orders had been placed remotely. Accordingly, the prioritized service of the locally placed digital orders would have the same effect as the user 101 bypasses the physical queue 180 in the venue, and consequently, would cause complaints on the additional wait time from the patrons in the physical queue 180. In order to ensure prompt and orderly services for the patrons waiting in the physical queue 180, the digital order system 120 arranges service sequences of the locally placed digital orders from the perspective of the physical queue 180.

In this specification, term "digital queue" indicates a queue of digital orders to be serviced at the venue; term "physical queue" indicates another queue of patrons waiting in a certain order to be services at the venue. Term "service queue" may indicate the digital queue, the physical queue, and/or the physical queue merged with one or more digital order, by way of the service queue engine 130 as described herein.

The digital order system 120 includes a venue boundary 123, digital order rules 127, and a service queue engine 130. The venue boundary 123 indicates a preconfigured threshold distance between the mobile device 110 and a predetermined location in the venue at time of receiving the digital order 191, which is utilized to determine whether the digital order 191 had been placed remotely or locally in and around the venue. The venue boundary 123 is configured based on various parameters, such as: a visibility of a service counter, measured in distance unit; a visibility of an area where the physical queue 180 would form in the venue, measured in distance unit; a type of services provided at the venue; and respective distances to other comparable service venues. In cases of venues with multiple geographical locations, each geographical location has a uniquely identified venue boundary 123, by use of GPS coordinates, etc.

The digital order rules 127 indicates rules affecting how the service queue engine 130 processes the digital order 191. According to the digital order rules 127 and various instances of controlling parameters, the service queue engine 130 may or may not integrate the locally placed digital order 191 with the physical queue 180. Examples of the digital order rules 127 may include, but are not limited to: to integrate the locally placed digital order 191 with the physical queue 180 when the digital order 191 includes a certain service item taking a certain preparation time but not for the locally placed digital order 191 that may be immediately serviced without additional delay for the patrons in the physical queue 180; to integrate the locally placed digital order 191 with the physical queue 180 when the user 101 opted out of an express service of the locally placed digital order 191 for a fee; to integrate the locally placed digital order 191 with the physical queue 180 during certain peak hours but not during off-peak hours; and to integrate the locally placed digital order 191 with the physical queue 180 when there are more patrons in the physical queue 180 than a certain threshold number but not when all patrons in the physical queue 180 may be serviced within a certain wait time limit.

The digital order system 120 is coupled to various data collection equipment 170 installed in and around the venue. The data collection equipment 170 captures and processes various images, data scanned and/or input from the data collection equipment 170. Examples of the data collection equipment 170 may include, but are not limited to, a closed circuit (CC) monitoring system, user terminals, venue employee terminals, radio frequency (RF) readers, and wireless communication devices for collecting the location data of the mobile device 110 as identified by the account profile 115.

The service queue engine 130 classifies the digital order 191 into either remote or local and integrates the local digital order 191 with the physical queue 180, based on the venue boundary 123, the digital order rules 127, as well as service queue data 150. The service queue data 150 includes a device virtual position 151, a physical queue status 153, and an order preparation time 157. The service queue data 150 may be collected from the data collection equipment 170 and/or generated by the service queue engine 130 based on inputs, both real-time data and cumulated data, from the data collection equipments 170. For example, the physical queue status 153, representing how many patrons are waiting in the physical queue 180, may be determined by utilizing Wi-Fi triangulation, object sensing, face counting, and distance measuring based on various signals from respective devices on the patrons, data acquired from Bluetooth beacons and cameras. Details on operations of the service queue engine 130 are presented in FIG. 2 and corresponding description.

Figure 2:
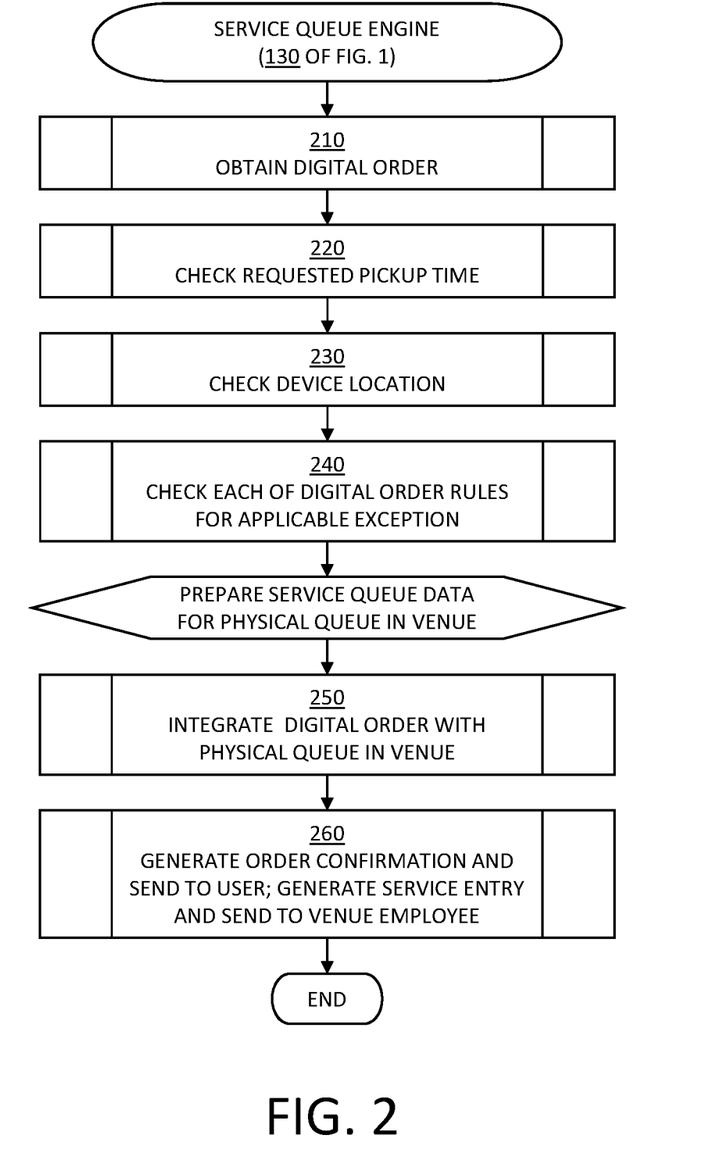
FIG. 2 depicts a flowchart of operations performed by the service queue engine, in accordance with one or more embodiments set forth herein.

FIG. 2 depicts a flowchart of operations performed by the service queue engine 130 of FIG. 1, in accordance with one or more embodiments set forth herein.

In block 210, the service queue engine 130 obtains the digital order 191 from the mobile device 110. The digital order 191 specifies ordered items, a requested pickup time, and the account profile 115 of the user 101. Then the service queue engine 130 proceeds with block 220.

In block 220, the service queue engine 130 determines if the requested pickup time of the digital order 191 is immediate, or otherwise any time prior to estimated physical queue service completion time, at which time the venue employee 105 is estimated to complete services for all patrons present in the physical queue 180 at the moment. The service queue engine 130 calculates the estimated physical queue service completion time based on parameters from the service queue data 150. If the requested pickup time is later than the estimated physical queue service completion time, then the service queue engine 130 puts the digital order 191 in a digital queue, which will be timely processed based on the requested pickup time and an estimated preparation time of the digital order 191, as specified in the digital order rules 127. If the requested pickup time meets aforementioned conditions indicating that the digital order 191 is not placed in advance, then the service queue engine 130 proceeds with block 230.

In block 230, the service queue engine 130 determines a geographical location of the mobile device 110 from which the digital order 191 had been submitted. In order to determine the location of the mobile device 110, the service queue engine 130 may first identify the mobile device 110 based on the account profile 115 sent with the digital order 110, and then searches inputs from the data collection equipment 170 at the venue. The service queue engine 130 subsequently determines if the mobile device 110 was within the venue boundary 123 at the time of order, according to the determined location of the mobile device 110. The venue boundary 123 is not restricted by physical dimensions of the venue, and may be configured for marketing needs of the venue. If the service queue engine 130 determines that the mobile device 110 was outside of the venue boundary 123, then the service queue engine 130 puts the digital order 191 in the digital queue, which will be timely processed based on the requested pickup time and the estimated preparation time of the digital order 191, as specified in the digital order rules 127. If the service queue engine 130 determines that the mobile device 110 was within the venue boundary 123, then the service queue engine 130 proceeds with block 240.

In block 240, the service queue engine 130 checks if there is any digital order rule applicable to except the digital order that had been placed locally for an immediate service from being integrated with the physical queue 180. In this specification, term "immediate service" indicates a service with a requested pickup time that is earlier than the estimated service time for the physical queue in the venue. If the service queue engine 130 discovers a digital order rule applicable to the digital order 191 as an exception, then the service queue engine 130 puts the digital order 191 in the digital queue, which will be timely processed based on the requested pickup time and the estimated preparation time of the digital order 191, as specified in the digital order rules 127. If the service queue engine 130 does not discover any digital order rule applicable to the digital order 191 for an exception, then the service queue engine 130 proceeds with block 250.

An example of such exception may be based on a preparation time for the digital order 191. For example, if the digital order 191 includes only the items that does not require any preparation time may be excepted from being integrated with the physical queue 180 and may be serviced immediately. For example, if the digital order is only for a bottled beverage from a refrigerator other than a food item and/or a gourmet drink from a kitchen, then the service queue engine 130 may not integrate the digital order with the physical queue 180 and permit an immediate service.

Another example of the exception may be based on user feedback and additional charges. For example, the digital order rules 127 may specify an option to buy an express service for the digital order, that had been locally placed and requests for an immediate service. In such cases, the service queue engine 130 reports the user 101 that, because the digital order 191 has been placed locally at the venue for an instant service, the requested digital order requires a certain express fare, additional to the purchase amount, indicating that the user is supposed to wait a certain period of time while the patrons currently present in the physical queue 180 are serviced. If the user agrees to pay the express fare, the service queue engine 130 may not integrate the digital order with the physical queue 180 and permit an immediate service.

In block 250, the service queue engine 130 integrates the digital order 191 with the physical queue 180 by determining a virtual position of the digital order 191 in the physical queue 180, as represented by the device virtual position 151 in the service queue data 150. The service queue data 150 contents are instantiated by the service queue engine 130 and/or the data collection equipment 170, prior to integrating the digital order 191 with the physical queue 180. The service queue engine 130 calculates the device virtual position 150 based on the physical queue status 153 and the order preparation time 157, at the time of the digital order 191. By integrating the digital order 191 with the physical queue 180 at the time of the digital order 191, the service queue engine 130 may treat the digital order 191 as a prospective order placed by another patron in the physical queue 180. Then the service queue engine 130 proceeds with block 260.

For example, the service queue engine 130 discovers that the service queue data 150 has N as a value of the physical queue status 153 upon receiving the digital order 191, indicating N patrons in the physical queue 180, where N is a positive integer. In the same example, the service queue engine 130 also discovers that a value of the order preparation time 157 is M, when the digital order 191 has been submitted, indicating it would take an average of M minutes to prepare an order for each of N patrons in the physical queue 180. In the same example, the service queue engine 130 determines the device virtual position 151 as equal to (N+1), based on that the digital order 191 might have been placed in the venue at the end of the physical queue 180 having N patrons.

In block 260, the service queue engine 130 generates the order confirmation 197 for the user 101 in response to the digital order 191 and sends the generated order confirmation 197 to the mobile device 110. Similarly, the service queue engine 130 generates the service entry 195 corresponding to the digital order 191 at a time calculated in block 250 and send the generated service entry 195 to the venue employee 105.

In the same example as above in block 250, the service queue engine 130 populates the service entry 195 with the items ordered in the digital order 191 with an instruction to begin preparation by the time (N*M) minutes from the time of sending the service entry 195, such that the N patrons in the physical queue 180 would be serviced before beginning to prepare for the digital order 191. In the same example, the order confirmation 197 may include an approximate service time, stating "Order summary—Estimated Wait Time: 20 minutes (about 9 people ahead of you)", where an average preparation time is 2 minutes per order. Because the digital order 191 is virtually in the tenth ($10^{th}$) position in the physical queue 180, that is, Value(device virtual position) =10, the venue employee will begin preparing the digital order 191 after 18 minutes when the 9 people are all serviced. As the user 101 also needs to wait another 2 minutes for the digital order 191 to be prepared until pickup, the total estimated wait time for the user 101 would be a sum of wait time for the physical queue and preparation time for the digital order, that is, 18+2=20 minutes. Then the service queue engine 130 terminates processing the digital order 191 obtained in block 210. The service queue engine 130 may loop back to block 210 for another digital order.

Certain embodiments of the present invention may offer various technical computing advantages, including service queue integration by using a virtual placement of a digital order in a physical queue at a venue, for non-remote digital orders. A mobile device location in relation with the venue is precisely determined by various wireless communication technology as well as image processing. By using pattern recognition technology, particularly facial recognition and object sensing, a number of patrons in the physical queue at the venue is determined. Certain embodiments of the present invention processes the digital order for the attributes determining whether or not the digital order may be handled as a virtual patron in the physical queue. Further the attributes of the digital order is compared against a preconfigured venue boundary and digital order rules to ensure the digital order offers convenience to a user who places the digital order with minimum adverse effect on the physical queue at the venue. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The venue service queue integration functionality may be provided for subscribed business entities in need from any location in the world.

Figure 3:
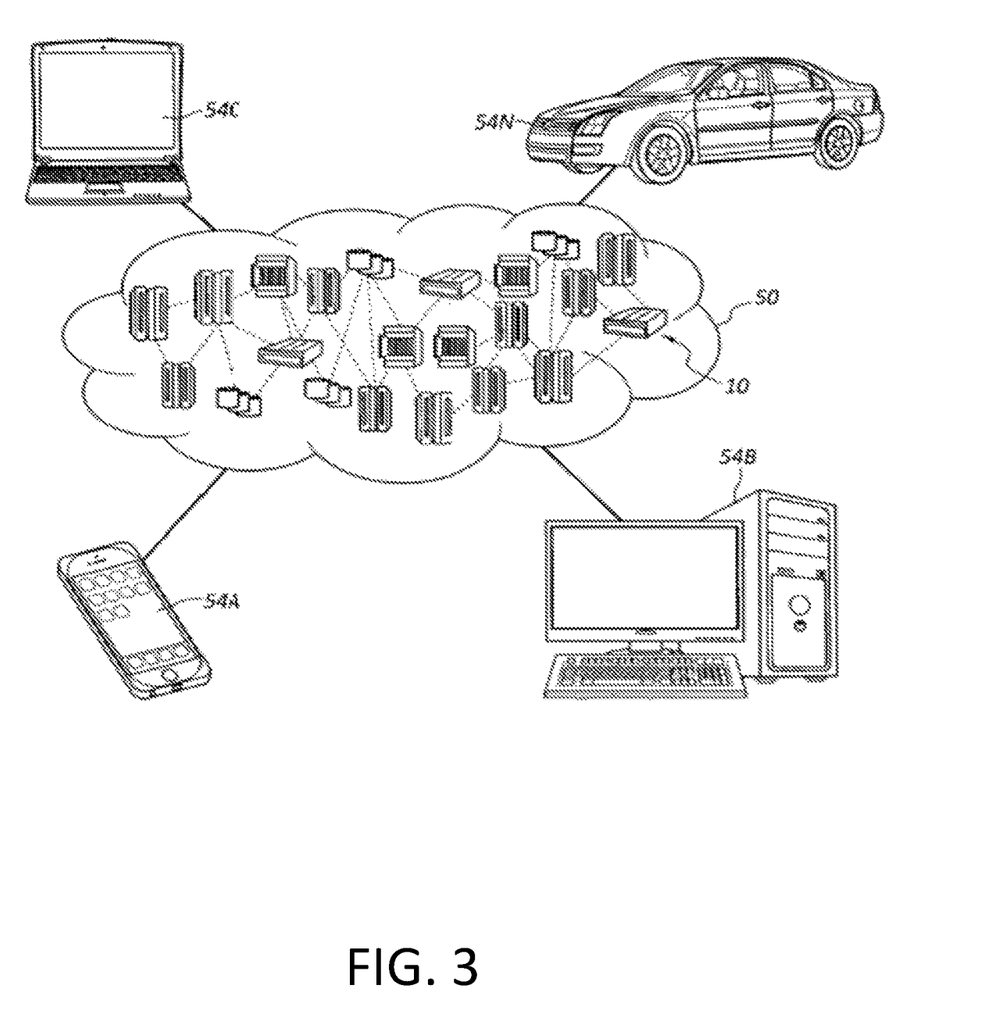
FIG. 3 depicts a cloud computing environment according to an embodiment of the present invention.
Figure 4:
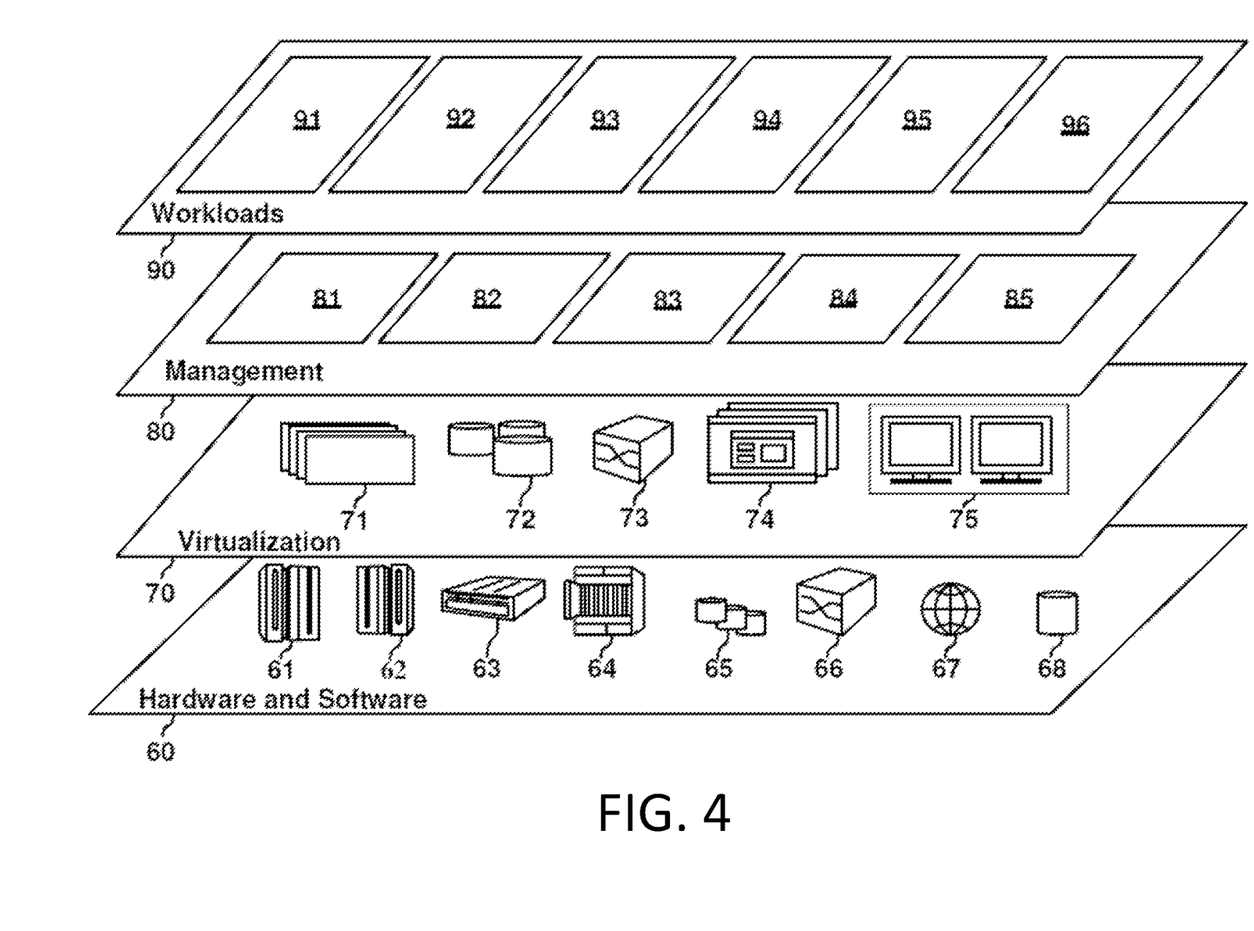
FIG. 4 depicts abstraction model layers according to an embodiment of the present invention.

FIGS. 3-4 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the service queue integration services as provided by the digital order system and the data collection equipment, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for optimally arranging an order of service for a digital order at a venue, comprising:
    obtaining, by one or more processor, the digital order from a mobile device of a user;
    ascertaining that the digital order requests an immediate service prior to servicing all patrons in the venue forming a physical queue, based on a requested pickup time associated with the digital order;
    determining that the digital order is local based on a location of the mobile device originating the digital order and a preconfigured venue boundary;
    searching one or more digital order rules that is applicable for the digital order, wherein the digital order is local and requesting the immediate service;
    integrating the digital order with the physical queue of patrons in the venue waiting to be serviced, by use of a device virtual position corresponding to the digital order in the physical queue, responsive to discovering no digital order rule applicable for the digital order from the searching; and
    facilitating the digital order to be serviced by notifying a venue employee of a service entry for the digital order, and by sending an order confirmation to the user with an estimated wait time.

2. The computer implemented method of claim 1, the determining comprising:
    identifying the mobile device based on an account profile of the user, wherein the account profile includes an identification of the mobile device;
    locating the mobile device by use of a selected device locating technique based on data generated from the mobile device as being collected by use of data collection equipment installed in and around the venue; and
    discovering that the location of the mobile device is within the preconfigured venue boundary, wherein the venue boundary includes the venue and areas surrounding the venue.

3. The computer implemented method of claim 1, wherein one of the one or more digital order rules indicates that, in cases where the digital order only includes one or more item that does not require any preparation time on the venue employee, the digital order can be immediately serviced as being separated from the physical queue.

4. The computer implemented method of claim 1, wherein another of the one or more digital order rules indicates that, in cases where the user agrees with an option to bypass the physical queue for an additional compensation, the digital order can be processed immediately serviced as being separated from the physical queue.

5. The computer implemented method of claim 1, the integrating comprising:
    calculating the device virtual position corresponding to the digital order, based on a number of the patrons in the physical queue at the time of the digital order and an average wait time for each of the patrons, such that the digital order would not affect respective wait time for the patrons in the physical queue; and
    merging the digital order with the physical queue at the device virtual position from calculating.

6. The computer implemented method of claim 1, the facilitating comprising:
    generating the order confirmation with an estimated wait time, as a sum of respective wait time for a number of the patrons in the physical queue at the time of the digital order, and a preparation time for the digital order; and
    generating the service entry directing the venue employee to begin preparing the digital order after a time period estimated to service the number of the patrons in the physical queue at the time of the digital order.

7. The computer implemented method of claim 1, wherein a number of the patrons in the physical queue is determined based on service queue data input from a plurality of data collection equipment in and around the venue.

8. A computer implemented method comprising:
    obtaining, by one or more processor of a cloud computing environment, a digital order for a service, requesting one or more service item, at a venue from a mobile device of a user, wherein the cloud computing environment provides a queue integration of the digital order to a physical queue of the venue to thereby process the digital order in a manner that the physical queue would also be serviced without an additional delay caused by the digital order for one or more venue including the venue in combination with the mobile device of the user and data collection equipment of the venue, wherein the physical queue of the venue indicates patrons currently waiting in a certain order at the venue to be serviced;

ascertaining that the digital order requests an immediate service earlier than an estimated service time for the physical queue in the venue, based on observing that a requested pickup time of the digital order is shorter than the estimated service time for all patrons in the venue forming the physical queue, wherein the requested pickup time in the digital order is set by the user;

determining that, in real time simultaneously with the obtaining, the digital order is local at the venue based on a location of the mobile device originating the digital order being within a venue boundary, wherein the location of the mobile device is determined based on location data of the mobile device detected by the data collection equipment of the venue indicating that the mobile device is within a working range of the data collection equipment of the venue, and wherein the venue boundary is preconfigured by use of GPS coordinates based on a visibility distance from one or more specified areas of the venue where the physical queue is formed and respective proximities from the venue to other comparable service venues;

searching, from storages of the cloud computing environment for the queue integration, for one or more digital order rules that is applicable for the digital order, wherein the digital order is local and requesting the immediate service, and wherein the one or more digital order rules is determined as being applicable to the digital order based on respective instances of controlling parameters with respect to information of the digital order, the controlling parameters including a preparation time corresponding to each of the one or more service item in the digital order, whether or not the user can select an express service overriding the physical queue for a fee, a time of the digital order during preconfigured peak hours, and a number of the patrons in the physical queue with respect to a certain wait time limit.

9. The computer implemented method of claim 8, further comprising:

discovering, amongst a plurality of digital orders stored in the cloud computing environment for the queue integration, the one or more digital order rules that is applicable for the digital order being placed locally from the searching, based on that the one or more service item requested by the digital order being placed locally can be immediately serviced without any delays for the patrons in the physical queue; and servicing the digital order being placed locally as an entry of a digital queue based on the requested pickup time of the digital order regardless of an estimated wait time of the physical queue.

10. The computer implemented method of claim 8, further comprising:

discovering, amongst a plurality of digital orders stored in the cloud computing environment for the queue integration, the one or more digital order rules that is applicable for the digital order being placed locally from the searching, based on that the user placed the digital order also purchased the express service overriding the physical queue; and servicing the digital order being placed locally as an entry of a digital queue based on the requested pickup time of the digital order regardless of an estimated wait time of the physical queue.

11. The computer implemented method of claim 8, further comprising:

discovering, amongst a plurality of digital orders stored in the cloud computing environment for the queue integration, the one or more digital order rules that is applicable for the digital order being placed locally from the searching, based on that the preparation time corresponding to the one or more service item in the digital order would not cause a delay beyond the certain wait time limit for the physical queue; and servicing the digital order being placed locally as an entry of a digital queue based on the requested pickup time of the digital order regardless of an estimated wait time of the physical queue.

12. A computer implemented method comprising:

obtaining, by one or more processor of a cloud computing environment, a digital order for a service at a venue from a mobile device of a user, wherein the cloud computing environment provides a queue integration of the digital order to a physical queue of the venue to thereby process the digital order in a manner that the physical queue would also be serviced without an additional delay caused by the digital order for one or more venue including the venue in combination with the mobile device of the user and data collection equipment of the venue, wherein the physical queue of the venue indicates patrons currently waiting in a certain order at the venue to be serviced;

ascertaining that the digital order requests an immediate service having a requested pickup time that is earlier than an estimated service time for all of the patrons in the venue forming the physical queue, based on the requested pickup time in the digital order set by the user;

determining that, in real time simultaneously with the obtaining, the digital order is local at the venue based on a location of the mobile device originating the digital order being within a venue boundary, wherein the location of the mobile device is based on information detecting the location of the mobile device and images of the venue captured by and sent from the data collection equipment of the venue, and wherein the venue boundary is preconfigured based on a visibility distance from the mobile device to one or more specified areas of the venue and respective proximities from the venue to other comparable service venues;

searching for one or more digital order rules that is applicable for the digital order, wherein the digital order is local and requesting the immediate service, and wherein the one or more digital order rules is determined as being applicable to the digital order based on respective instances of controlling parameters with respect to information of the digital order, the controlling parameters including a preparation time corresponding to a service item in the digital order, whether or not the user can select an express service overriding the physical queue for a fee, a time of the digital order during preconfigured peak hours, and a number of the patrons in the physical queue with respect to a certain wait time limit.

13. The computer implemented method of claim 12, further comprising:

discovering that the one or more digital order rules applicable to the digital order as an exception; and placing the digital order in a digital queue for the venue, wherein the digital order in the digital queue is serviced based on the requested pickup time and an estimated wait time.

14. The computer implemented method of claim 12, further comprising:

discovering that the one or more digital order rules applicable to the digital order as an exception, wherein the preparation time corresponding to the service item in the digital order can be immediately serviced without a delay for the patrons in the physical queue; and placing the digital order in a digital queue for the venue, wherein the digital order in the digital queue is serviced based on the requested pickup time and an estimated wait time.

15. The computer implemented method of claim 12, further comprising:

discovering that the one or more digital order rules applicable to the digital order as an exception, wherein the user who placed the digital order opted in for the express service for the fee; and placing the digital order in a digital queue for the venue, wherein the digital order in the digital queue is serviced based on the requested pickup time and an estimated wait time.

16. The computer implemented method of claim 12, further comprising:

discovering that the one or more digital order rules applicable to the digital order as an exception, wherein the digital order has been placed during off-peak hours; and placing the digital order in a digital queue for the venue, wherein the digital order in the digital queue is serviced based on the requested pickup time and an estimated wait time.

17. The computer implemented method of claim 12, further comprising:

discovering, in a result from the searching, no digital order rule that excludes the digital order from placing the digital order in the physical queue;

merging the digital order with the physical queue of the patrons in the venue waiting to be serviced, at a device virtual position corresponding to the digital order in the physical queue, wherein the device virtual position corresponding to the digital order is placed as a next patron in the physical queue in the venue at the time of the digital order; and facilitating the digital order to be serviced by notifying a venue employee of a service entry for the digital order and by sending an order confirmation to the user with an estimated wait time.

18. The computer implemented method of claim 12, wherein the number of the patrons in the physical queue is determined based on service queue data input from the data collection equipment installed in and around the venue, wherein the service queue data comprises a device virtual position corresponding to the digital order in the physical queue, a physical queue status, and an order preparation time indicating an average number of minutes to service the number of the patrons in the physical queue, and wherein the data collection equipment is selected from the group consisting of: a closed circuit (CC) monitoring system, user terminals, venue employee terminals, radio frequency readers, and any combination of digital communication devices that interacts with the mobile device.

19. The computer implemented method of claim 12, wherein the venue boundary is uniquely identified for the venue by use of global positioning system (GPS) coordinates.

20. The computer implemented method of claim 12, wherein the one or more digital order rules that is applicable for the digital order, identifies whether or not the digital order that had been originated within the venue boundary is to be integrated with the physical queue in the venue, based on a combination of: data from digital order system and service queue data describing a physical queue service status.

* * * * *